United States Patent Office 3,131,163
Patented Apr. 28, 1964

3,131,163
PROCESS OF POLYMERIZATION OF ACRYLONITRILE IN THE PRESENCE OF ITACONIC ANHYDRIDE POLYMER
Gaetano F. D'Alelio and Andreas A. Hunyar, South Bend, Ind., assignors to Von Kohorn Constructora, S.A., Panama, Panama, a corporation of Panama
No Drawing. Filed May 9, 1961, Ser. No. 108,719
15 Claims. (Cl. 260—45.5)

This invention relates to a process for polymerization grafting of acrylonitrile polymers. More specifically, it relates to a process of grafting acrylonitrile to a polymer of itaconic anhydride. Also, more specifically, it relates to the preparation of substantially colorless solutions of acrylonitrile copolymers especially suitable for spinning into fibers.

The resistance of acrylonitrile polymers to dyes of all kinds has presented serious dyeing problems, particularly in the use of such polymers as synthetic fibers. Various methods of improving dye receptivity of acrylonitrile polymers have been proposed. The fact that so many methods have been proposed is an indication of the difficulty in overcoming this problem and also is an indication that this problem has not been solved. Some proposals overcome one or more objectionable features but in turn introduce other factors which are drawbacks in the commercial exploitation of such methods for improving the dyeability of acrylonitrile polymers.

Some of the methods proposed for this purpose involve the use of various comonomers which will improve the dye receptivity of the acrylonitrile polymers. For use with basic dyes, acidic comonomers have been suggested, such as acrylic acid, itaconic acid, itaconic anhydride, itaconic mono- and di-esters, etc. While acrylic and methacrylic acids impart good dye receptivity and other properties, they do show very poor heat stability, that is the copolymers develop considerable discoloration upon heating at 150° C. for 30 minutes, the colors varying from intense yellow to dark brown and even black, with a corresponding degradation of the physical properties of the fiber. Itaconic acid esters while imparting good dye receptivity also give copolymers having poor thermal stability. In contrast, the itaconic di-esters impart good thermal stability to the polymer but they exhibit much poorer dye receptivity.

The preferred polymer in the practice of the present invention contains itacoinc anhydride because we have discovered that its graft polymers with acrylonitrile show not only good dye receptivity but good thermal stability as well. Moreover, as disclosed in applicants' copending application Serial No. 108,718, filed the same date herewith, the use of potassium persulfate under controlled conditions can be used to catalyze copolymerization of small amounts of itaconic anhydride with acrylonitrile to give colorless products. With larger amounts of itaconic anhydride and the use of the same process acrylonitrile copolymers can be prepared having less color than are derived by using various other catalysts, such as ammonium persulfate, benzoyl peroxide, toluene sulfinic acid, etc. However, in such cases larger amounts of itaconic anhydride monomer tend to lower the molecular weight of the copolymer and to reduce the rate of conversion of monomer to polymer.

It has been known that acrylonitrile polymers having molecular weights below about 30,000 generally are not spinnable. At molecular weights of about 35,000, the polymers are spinnable but cannot be stretched without breaking. Above molecular weights of 35,000 the spinnability and stretchability are improved and the elongation, tensile strength, loop strength, etc. of the spun fiber increase gradually with the increase in molecular weight. For most commercial purposes, molecular weights above 50,000 are preferred, and for certain purposes molecular weights as low as 40,000 are very useful.

The importance of overcoming the tendency of itaconic anhydride monomer to cause lower molecular weight polymers to be formed, therefore, is apparent since the resultant copolymers are generally not in the desired range. Moreover, reduction in the percent conversion makes such copolymerization less attractive for commercial exploitation.

For dissolving and spinning preformed polyacrylonitrile and various copolymers containing at least 85 percent acrylonitrile therein, it has been proposed that a number of solvents such as dimethyl formamide, dimethyl acetamide, dimethyl sulfoxide, etc., can be used. For a number of reasons, dimethyl formamide and dimethyl acetamide have been preferred for this purpose. For example, they are inexpensive, easy to produce, easily recovered for reuse, and versatile in that their acrylonitrile polymer solutions can be used either in dry spinning or wet spinning, etc. Moreover, these appear to have the best solvent power of the various solvents proposed and allow the highest concentration of polymer to be dissolved therein while maintaining a fluidity or low viscosity and thereby facilitating use of the solution.

In contrast, dimethyl sulfoxide, for example, cannot be used for solutions containing more than 15 percent acrylonitrile polymer. The reason is that the resultant high viscosity of the dimethyl sulfoxide-acrylonitrile polymer solution which results when more than 15 percent of polymer is contained therein requires the use of higher temperatures than desirable to effect solution and to permit spinning. These higher temperatures cause discoloration of the solution, the polymer and the fibers spun therefrom. However, solutions of 20-25 percent of acrylonitrile polymers in dimethyl formamide and dimethyl acetamide have sufficiently low viscosity that the solutions can be handled and processed easily at room temperature.

Although it does not have quite as good solvent power as dimethyl formamide (DMF), dimethyl acetamide (DMA) has several advantages over dimethyl formamide which makes its use advantageous as compared to the use of DMF. For example, dimethyl acetamide has a higher boiling point and therefore there is less loss in recovery of the solvent. Moreover, it has less tendency than DMF to hydrolyze in water and it is also less toxic than DMF.

In order to avoid the additional steps of recovering polymer and then dissolving the separated polymer in the solvent to prepare the polymer solutions for spinning, it is desirable to prepare the polymer in situ by polymerizing the acrylonitrile, together with any desired comonomers, in the solvent and to use the resultant solution of the polymer directly as the spinning solution.

However, such a process has not been considered feasible in dimethyl acetamide because of the high radical-transfer coefficient of the dimethyl acetamide solvent with resultant telomerization and low molecular weight polymers being formed. Thus the transfer coefficient of DMA is $48.1 \times 10^{-5}$ whereas it is only $27.0 \times 10^{-5}$ for DMF. As a result the polymers produced by solution polymerization in DMA generally have a lower molecular weight than those produced in DMF. For that reason, DMA has been regarded as unsatisfactory as a solvent for commercial production of spinnable fibers by solution polymerization.

Furthermore, it has previously been impractical to conduct acrylonitrile polymerizations in dimethyl acetamide since considerable color formation results when using various well-known catalysts, such as ammonium persulfate, benzoyl peroxide, toluene sulfinic acid, etc. Moreover, certain catalysts such as di-t-butyl peroxide and t-butyl hydroperoxide, are ineffective for such polymerizations in dimethyl acetamide.

The presence of color in the acrylonitrile polymers is highly undesirable since this interferes with subsequent application of dyes. Where light colored dyes are to be applied, the results are entirely unsatisfactory where color is present in the original polymer. While some small amounts of color can be tolerated or compensated for when dark colored dyes are to be applied, substantial amounts of color are highly undesirable since they cause somewhat erratic dyeing in view of the variations of color in the polymer and also because corresponding degrees of dyeing in such cases are difficult to reproduce. Moreover, the adjustment for this initial color in the polymer is highly unsatisfactory in that more careful control and inspection in the application of the dye are required, and even in such cases, the color matches are poor.

Therefore, it is highly desirable that the acrylonitrile polymer be produced in a colorless or, at most, a practically colorless condition. Heretofore this has been another disadvantage in the desired process of preparing the acrylonitrile polymer in situ by solution polymerization in dimethyl acetamide.

Applicants' copending application filed on the same date herewith discloses a process for polymerization of acrylonitrile in dimethyl acetamide using potassium persulfate under carefully controlled conditions to give polymers which are colorless, or practically colorless. However, as pointed out above, when substantial amounts of itaconic anhydride are copolymerized with acrylonitrile, the molecular weight and degree of conversion are not as high as is desirable for commercial exploitation.

In view of the effect of the high transfer coefficient of dimethyl acetamide and other difficulties described above, it is most surprising that it has now been found possible to produce polymers of acrylonitrile of improved color, in most cases colorless or substantially colorless, of desired molecular weight, and of improved dye receptivity and of excellent thermal stability, by graft-polymerization in dimethyl acetamide solution which also contains a preformed polymer of itaconic anhydride, by the use of potassium persulfate as the graft-polymerization catalyst and by the careful control of various conditions. By the practice of this invention it is possible to prepare colorless polymers, at the worst practically colorless polymers, of acrylonitrile grafted to preformed itaconic anhydride polymers, containing at least 85 percent acrylonitrile in the resultant grafted copolymer, by using 0.1–0.7 percent, preferably 0.1–0.6 percent, by weight of potassium persulfate based on the weight of monomer portion in said solution, and 20–35 percent of monomer, including the acrylonitrile and any comonomer or comonomers that may be used, based on a total weight of solution, in dimethyl acetamide at a temperature in the range of 35–55° C., preferably 40–50° C., until a conversion of at least 30 percent, preferably, at least 40 percent of monomer to polymer having an average molecular weight of at least about 40,000, preferably at least 50,000 has been effected.

It has been found that where it is desired to have molecular weights of over 50,000, this can be effected by using lesser amounts of potassium persulfate, that is in the lower part of the indicated range.

While the time necessary to effect such minimum conversion depends somewhat on the temperature, the amount of catalyst, and the concentration of monomer, satisfactory results are generally obtained in a reaction time of 20–50 hours.

In preparing acrylonitrile polymers for spinning into fiber, or for forming film, or for various other uses for which solutions of acrylonitrile polymers can be used, it is generally desirable to have present in the polymer at least 0.1 and as much as 15 percent of one or more comonomers which improve the solubility characteristics of the acrylonitrile polymer and to facilitate processing of the polymer solution and the ultimate shaped article. The use of such comonomers for improving the solubility characteristics of the acrylonitrile polymers is also found desirable in the practice of this invention. However, the amount of comonomers including itaconic anhydride introduced as the result of the grafting of the preformed itaconic anhydride polymer is taken into consideration in calculating the 15 percent of monomer that can be present in the resultant acrylonitrile copolymers.

Various typical comonomers which have been found useful for this purpose are listed hereinafter; of particular usefulness are the methyl, ethyl, propyl and isopropyl acrylates. In the present invention the methyl and ethyl acrylates are preferred because they are inexpensive, easily available, and polymerize easily with the acrylonitrile and with other comonomers, etc. Most important, however, is the fact that methyl and ethyl acrylates have polymerization rates close to the ideal polymerization rate for effecting a uniform composition in the resultant copolymer. In other words, their polymerization rates are close to that for acrylonitrile and, therefore, the two monomers copolymerize in such a manner as to give a substantially uniform copolymer composition.

The preformed itaconic anhydride polymers to be used in the graft-polymerization of this invention preferably contain not less than 10 percent, advantageously not less than 30 percent by weight of itaconic anhydride therein. The molecular weight of the itaconic anhydride polymer is not critical but is advantageously at least 4,000. While there is no limit to the molecular weight than can be used for this purpose, there is no particular advantage in using molecular weights of more than 100,000 for the itaconic anhydride polymer. Actually, molecular weights in the range of 4,000–100,000 are preferred to give greater uniformity in distribution of the polymer as grafted side chains to the acrylonitrile polymer. The itaconic anhydride portion of the prepolymer represents 0.1–10, preferably 0.5–5, percent by weight, of the combined weight of the monomer portion and the prepolymer, in the dimethyl acetamide solution used in the graft-polymerization.

The invention is best illustrated by the following examples which demonstrate methods of practicing the invention and the results obtained thereby. These examples are not intended in any way to restrict the scope of the invention and are presented merely as illustrations of various methods by which the invention can be practiced. Parts and percentages indicated in the examples and throughout the specification are parts by weight and percentages by weight unless specifically indicated otherwise. Methods for determining the molecular weights and for measuring the conversion of monomer to polymer are described hereinafter.

EXAMPLE 1

A copolymer is prepared by polymerizing 18 parts of itaconic anhydride, 24 parts of styrene, and 100 parts of dioxane, using 0.5 part of benzoyl peroxide, for 6 hours at 20° C., then refluxed for 3 hours. The copolymer is precipitated with heptane and after separation is easily dissolved in dimethyl acetamide to give a colorless solution.

EXAMPLE 2

A copolymer similar to that of Example 1 is prepared using the same proportions of material except that toluene is used as the solvent. The product is precipitated with methanol and after separation is found to be easily soluble in dimethyl acetamide at room temperature to give a colorless solution.

EXAMPLE 3

Itaconic anhydride is polymerized in toluene at 70° C. by using 0.5 percent of benzoyl peroxide, based on the amount of itaconic anhydride. The polymer product is soluble in dimethyl acetamide upon heating slightly.

EXAMPLE 4

For testing the dyeability of the various graft polymers prepared in subsequent examples, a solution of methylene blue dye (a basic dye) is prepared by making a paste of the dye with one percent by weight dye solution. This dye solution is kept boiling for one hour while a polymer film prepared from the particular polymer to be tested is immersed therein for one hour. The dyed films are then removed and separately subjected to washing with boiling water for one hour, the boiling water being changed frequently to remove the desorbed dye. Identical films, cold drawn and heat treated also showed good dyeing characteristics.

EXAMPLE 5

Using a number of itaconic anhydride polymers prepared according to the procedures of Examples 2 and 3 above, and using the proportions of styrene and itaconic anhydride indicated in Table I, a series of graft-polymerizations are conductionted in dimethyl acetamide solution using the persulfate catalysts and amounts indicated and also the quantities of acrylonitrile and methyl acrylate comonomer indicated in the table. The polymerizations in each case are conducted by dissolving the indicated amount of itaconic anhydride prepolymer in 280 parts of dimethyl acetamide containing the indicated amount of catalyst dissolved therein. Then the acrylonitrile monomer, and methyl acrylate where indicated, is added and the container closed. The catalyst percent is based on the weight of monomer used and the molecular weights are average molecular weights determined as described hereinafter. The temperature is then maintained at 45° C. for a period of 48 hours. In each case, the potassium persulfate polymers have molecular weights well over 70,000. Where color formation makes the polymers undesirable for further use, such as those prepared by the use of ammonium persulfate, the polymers are not tested for dye receptivity nor heat stability.

acrylonitrile have substantial amounts of color upon preparation, and upon exposure to the heat stability test in which the polymer films are heated at 150° C. for 30 minutes, the color in each case is increased very markedly. The graft copolymer resulting from the monomethyl itaconate polymers in each case has practically no color upon formation but upon exposure to the thermal stability test each film shows considerable color formation.

By the practice of this invention, therefore, it is possible to prepare, by solution polymerization in dimethyl acetamide, acrylonitrile copolymers of the desired molecular weight and freedom from color and still gain the advantages of the excellent dye receptivity and thermal stability imparted by the presence of itaconic anhydride in the copolymers.

In addition to the solvents used in Examples 1–3, various other solvents can be used for this purpose. The solvents and conditions of Examples 1–3 are given merely to illustrate typical methods for preparing the itaconic anhydride prepolymer. Any method giving such prepolymers in a practically colorless condition can be used.

As indicated in the examples, various comonomers can be used with itaconic anhydride to form the copolymers onto which is grafted the acrylonitrile polymer. Such comonomers are selected according to their ease in polymerizing with itaconic anhydrides, increasing the solubility of the resultant copolymer, freedom from color formation, etc. Comonomers particularly suitable for this purpose include the following which can be used individually or in combinations of two, three or more comonomers: methyl acrylate and its homologs, namely the ethyl, propyl, butyl, and amyl acrylates; the corresponding methacrylates; vinyl acetate, vinyl propionate, vinyl butyrate, vinyl valerate, dialkyl itaconates, maleates and fumarates, the alkyl groups being similar or different and preferably lower alkyl groups, i.e., containing no more than 5 carbon atoms, such as dimethyl itaconate, diethyl maleate, methyl amyl itaconate, ethyl butyl fumarate,

*Table I*

| Acrylo-nitrile, Parts | Methyl Acrylate, Parts | Itaconic Anhydride Prepolymer | | | Catalyst | | Product |
|---|---|---|---|---|---|---|---|
| | | Percent Styrene | Percent Itaconic | Parts | Type | Percent | |
| 100 | | 85 | 15 | 10 | K$_2$S$_2$O$_8$ | 0.20 | Colorless with good dye receptivity and heat stability. |
| 100 | | 85 | 15 | 10 | (NH$_4$)$_2$S$_2$O$_8$ | 0.20 | yellow. |
| 94 | 6 | 75 | 25 | 5 | K$_2$S$_2$O$_8$ | 0.20 | Colorless, good dye receptivity good heat stability. |
| 94 | 6 | 75 | 25 | 5 | (NH$_4$)$_2$S$_2$O$_8$ | 0.20 | yellow. |
| 90 | 10 | 50 | 50 | 4 | K$_2$S$_2$O$_8$ | 0.15 | Colorless, good dyeing and heat stability. |
| 90 | 10 | 25 | 75 | 2 | K$_2$S$_2$O$_8$ | 0.20 | Do. |
| 94 | 6 | | 100 | 4 | K$_2$S$_2$O$_8$ | 0.20 | Do. |

EXAMPLE 6

The procedure of Example 5 is repeated with similar results using the same amount of styrene, vinyl acetate, methyl methacrylate and vinyl chloride respectively in place of the methyl acrylate in the monomer mixture.

EXAMPLE 7

The procedure of Example 5 is repeated with similar results using itaconic anhydride prepolymer formed with corresponding amounts of methyl acrylate, vinyl acetate, butyl acrylate, vinylidene chloride, vinyl toluene, and vinyl naphthalene as the comonomer in place of the styrene, and prepared as in Example 2 or 1.

EXAMPLE 8

The procedure of Example 5 is repeated except that polymers of acrylic acid, maleic acid, the methyl half ester of itaconic acid, are used in place of the itaconic anhydride polymers. These polymers also are prepared according to the procedure of Examples 2 and 3. In each case the acrylic and maleic acid graft copolymers of diamyl itaconate, etc.; vinyl chloride vinylidene chloride, vinyl aryl compounds, such as styrene, vinyl naphthalene, and vinyl diphenyl, the corresponding alpha-methyl derivatives, and the nuclear substituted derivatives thereof in which the nuclear substitutents are chlorine, fluorine, acetoxy, and alkyl groups, said alkyl groups preferably having no more than 5 carbon atoms therein. Such substituted vinyl aryl compounds can have one or more substituent groups of the type indicated thereon, either of the same or different types, but it is generally preferred that no more than two such substituent groups be attached to an aromatic nucleus.

Typical examples of such substituted vinyl aryl comonomers are: vinyl toluene, ethyl styrene, propyl styrene, butyl styrene, amyl styrene, dimethyl styrene, diethyl styrene, methyl ethyl styrene, methyl amyl styrene, chloro styrene, fluoro styrene, dichloro styrene, difluoro styrene, methyl chloro styrene, methyl fluoro styrene, trifluoro-methyl styrene, acetoxy styrene, acetoxymethyl styrene, chloro acetoxy styrene, vinyl methyl naphthalene, vinyl chloro naphthalene, vinyl fluoronaphthalene, vinyl ethyl naphthalene, vinyl dimethyl naphthalene, vinyl diethyl naphthalene, vinyl methyl chloro naphthalene, vinyl amyl naphthalene, vinyl methyl butyl naphthalene, vinyl acetoxy naphthalene, alpha-methyl styrene, alpha-methyl-vinyl toluene, alpha-methyl-vinyl ethyl benzene, alpha-methyl-vinyl chloro benzene, alpha-methyl-vinyl methyl naphthalene, alpha-methyl-vinyl chloro naphthalene, alpha-methyl-vinyl acetoxy naphthalene, alpha-methyl-vinyl diphenyl, or similar unsaturated compounds such as isopropenyl methyl diphenyl, isopropenyl chloro diphenyl, isopropenyl methyl diphenyl, isopropenyl dimethyl diphenyl, isopropenyl butyl diphenyl, etc.

The basic dyestuffs toward which these copolymers show great affinity are preferably those which contain amido, alkylamido or ammonium groups, such as $-NH_2$, $-N(CH_3)_2$, $-N(C_2H_5)_2$, $-NHC_6H_5$, $-N(CH_3)_3OH$, etc. and which can also be used in the form of their salts, i.e. the hydrochlorides, sulfates, oxalates, etc. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Saffranine and Bismarck Brown. The cellulose acetate dyes which are effective with these copolymers are mainly amino-anthaquinone derivatives, basic azo compounds and other basic substances.

Various monomers which are particularly preferred for copolymerization with acrylonitrile to improve the solubility and workability of polymers, and which have been found to give colorless or practically colorless copolymers when prepared according to this invention, include the following, which can be used individually or in combination of two, three or more comonomers: methyl acrylate and its homologs, namely the ethyl, propyl, butyl and amyl acrylates; the corresponding methacrylates, namely methyl, ethyl, propyl, butyl and amyl methacrylates; vinyl acetate, vinyl propionate, vinyl butyrate, vinyl valerate; dialkyl itaconates, maleates and fumarates, the alkyl groups being similar or different and preferably lower alkyl groups, i.e., containing no more than 5 carbon atoms, such as dimethyl itaconate, diethyl maleate, dimethyl fumarate, methyl amyl itaconate, ethyl butyl fumurate, diamyl itaconate, etc.; vinyl chloride, vinylidene chloride, vinylidene cyanide, alpha-methacrylonitrile, alpha-acetoxy-acrylonitrile, vinyl aryl compounds, such as styrene, vinyl naphthalene and vinyl diphenyl, and the corresponding alpha-methyl derivatives, and the nuclear-substituted derivatives thereof in which the nuclear substituents are chlorine, fluorine, acetoxy and alkyl groups, said alkyl groups preferably having no more than 5 carbons therein. Such substituted vinyl aryl compounds can have one or more substituent groups of the type indicated, either of the same or different types, but it is generally preferred that no more than two such substituent groups be attached to an aromatic nucleus. Typical examples of such substituted vinyl aryl comonomers are listed above in connection with comonomers suitable for itaconic anhydride copolymers.

While the above comonomers are particularly preferred for forming more soluble and more easily workable acrylonitrile copolymers, various other comonomers can be used in preparing copolymers of acylonitrile in accordance with the practice of this invention, including higher alkyl derivatives of the various esters and vinyl aryl compounds listed above, as well as corresponding aryl and cycloalkyl derivatives. Various other comonomers, such as acrylamides and methacrylamides, both unsubstituted and substituted with various alkyl, aromatic and cycloalkyl groups, as well as various other comonomers shown in the prior art, can be used.

Obviously any reasonably accurate method of determining molecular weight can be used. However, the method used in determining molecular weights in the above examples is as follows: A solution of about 0.5 percent by weight of polymer or copolymer is made in dimethyl acetamide, and the viscosity measured at 20° C. in an Ostwald viscometer, and recorded as $t_s$, the time of flow in minutes. The time of flow in minutes, $t_0$, for the pure dimethyl acetamide solvent is also measured; and the specific viscosity $\eta_{sp}$ is given as $t_s-t_0/t_0$ from which the molecular weight is calculated from the relationship $\eta_{sp}=M \cdot K \cdot C$. K has a value of $1.5 \times 10^{-4}$. C equals the number of grams of polymer per liter divided by the molecular weight of acrylonitrile, and M is the molecular weight.

The percent of polymer conversion is easily determined by weighing out a quantity of polymer solution in a small beaker, allowing the greater portion of the solvent and unconverted monomer to evaporate to form a film, then drying to constant weight and thereafter weighing the dried polymer film. Knowing the original proportion of monomer in the solution, and the weight of dried film derived from a given weight of solution, it is possible to determine the percent of polymer resulting from the starting amount of monomer. Alternately the polymer solution may be precipated with water, the polymer isolated by filtration and dried to constant weight and the conversion calculated.

In addition to the various advantages cited above for the use of potassium persulfate and the stated conditions for polymerization of acrylonitrile, it also has been found that with potassium persulfate higher degrees of polymer conversion can be effected without gel formation than is the case with other catalysts, such as ammonium persulfate.

It is generally desirable to perform polymerizations of acrylonitrile and mixtures with various comonomers in an oxygen-free or inert atmosphere and this is also desirable with the potassium persulfate process described herein. However, the color of the resulting solution is not seriously affected by the presence of small amounts of oxygen, which is in contrast to the ammonium persulfate system wherein the discoloration is intensified by oxygen-containing atmospheres. Gases such as nitrogen, carbon dioxide, neon, helium, hydrogen, and methane are particularly suitable as inert, blanketing media for the process and products of this invention.

The process of this invention lends itself very conveniently to continuous operation as well as batch polymerization and spinning. In continuous operation the residence time for effecting polymerization in the proper temperature zone can be controlled by adjusting the flow rate of the monomer dimethyl acetamide solution in accordance with the size of the vessel or zone of pipe in which the temperature is properly maintained for effecting polymerization. The resultant polymer solution can then be flowed directly into the spinning apparatus or can be cooled to retard further polymerization and thus stored until desired for spinning. However, a preferred procedure is to remove unpolymerized monomer from the solutions by distillation processes and the resulting stable solution used directly or stored for future use. Alternately, the solution can be allowed to polymerize to high conversion simultaneously with further addition of dimethyl acetamide with or without more potassium persulfate until substantially a 100% conversion is obtained. The spinning techniques and further processing and use of the polymers of this invention can be effected in accordance with standard procedures used for such processes and products.

While certain features of this invention have been described in detail with respect to various embodiments thereof, it will, of course, be apparent that other modifications can be made within the spirit and scope of the invention and it is not intended to limit the invention to the exact details shown above, except insofar as they are defined in the following claims.

The invention claimed is:

1. A process for preparing acrylonitrile copolymers of improved color and of improved dye receptivity, comprising the step of polymerizing a polymerizable mass comprising a monomer portion, comprising acrylonitrile monomer, and a preformed polymer, said preformed polymer containing at least 10 percent by weight of itaconic anhydride moiety therein, said monomer portion and said preformed polymer being dissolved in dimethyl acetamide, said polymerization being effected in the presence of 0.1–0.7 percent by weight of potassium persulfate based on the weight of said monomer portion, while maintaining said dimethyl acetamide solution at a temperature in the range of 35–55° C. until at least 30 percent by weight of said acrylonitrile monomer has been converted to polymer having a molecular weight of at least 40,000, said dimethyl acetamide solution initially comprising 25–35 percent by weight of said monomer portion, said acrylonitrile monomer comprising at least 85 percent by weight of the combined weight of said monomer portion and said preformed itaconic anhydride moiety polymer, and the itaconic anhydride moiety portion of said preformed polymer comprising 0.1–10 percent by weight of the combined weight of said monomer portion and said preformed polymer.

2. A process of claim 1, in which said temperature is maintained at 40–50° C.

3. A process of claim 1, in which said itaconic anhydride preformed polymer has at least 30 percent by weight of itaconic anhydride moiety therein.

4. A process of claim 1, in which said dimethyl acetamide solution also contains initially between 0.1 and 15 percent by weight of at least one comonomer selected from the class consisting of alkyl acrylates and methacrylates and dialkyl esters of itaconic acid and maleic acid wherein said alkyl groups each have no more than 5 carbon atoms therein, vinyl esters of saturated aliphatic carboxylic acids having no more than 5 carbon atoms in each said acid, vinyl chloride, vinylidene chloride, vinylidene cyanide, alpha-methacrylonitrile, alpha-acetoxy acrylonitrile, and vinyl and isopropenyl derivatives of benzene, naphthalene and diphenyl in which said vinyl and isopropenyl radicals are attached directly to said benzene, naphthalene and diphenyl nuclei, and the nuclear substituted derivatives thereof in which said derivative groups are selected from the class consisting of chloro, fluoro and alkyl radicals having no more than 5 carbon atoms therein.

5. A process of claim 4, in which said temperature is maintained at 40–50° C.

6. A process of claim 4, in which said comonomer is methyl methacrylate.

7. A process of claim 4, in which said comonomer is methyl acrylate.

8. A process of claim 7, in which said temperature is maintained at 40–50° C.

9. A process of claim 4, in which said comonomer is vinyl acetate.

10. A process of claim 4, in which said comonomer is vinyl chloride.

11. A process of claim 4, in which said comonomer is styrene.

12. A process of claim 1, in which said itaconic anhydride preformed polymer is a copolymer of styrene.

13. A process of claim 1, in which said itaconic anhydride preformed polymer is a copolymer of methyl acrylate.

14. A process of claim 1, in which said itaconic anhydride preformed polymer is a copolymer of vinyl acetate.

15. A process of claim 4, in which said itaconic anhydride preformed polymer is a copolymer of styrene.

References Cited in the file of this patent

UNITED STATES PATENTS

| | | |
|---|---|---|
| 2,649,434 | Coover et al. | Aug. 18, 1953 |
| 2,719,136 | Caldwell | Sept. 27, 1955 |
| 2,794,793 | Coover | June 4, 1957 |